United States Patent
Baer

[11] Patent Number: 5,275,035
[45] Date of Patent: Jan. 4, 1994

[54] AUTOCALIBRATING TRIP CONTROLLER WITH DUAL ADJUSTABLE TRIP POINTS

[75] Inventor: Daniel J. Baer, Gilroy, Calif.

[73] Assignee: VLSI Technology, Inc., San Jose, Calif.

[21] Appl. No.: 773,391

[22] Filed: Oct. 8, 1991

[51] Int. Cl.$^5$ ............... G01L 27/00; H01H 35/00; H01H 35/24
[52] U.S. Cl. ............... 73/1 R; 200/83 SA; 307/116
[58] Field of Search ............... 73/1; 324/418, 158; 340/644; 307/116, 118; 200/83

[56] References Cited

U.S. PATENT DOCUMENTS

| | | | |
|---|---|---|---|
| 3,585,841 | 6/1971 | Brandau et al. | 73/726 X |
| 3,657,926 | 4/1972 | Munson et al. | 73/1 R X |
| 3,974,472 | 8/1976 | Gould, Jr. | 307/116 X |
| 4,047,421 | 9/1977 | Spiers et al. | 73/1 R |
| 4,228,511 | 10/1980 | Simcoe et al. | 307/39 X |
| 4,263,803 | 4/1981 | Burkhardt | 73/1 R |
| 4,619,135 | 10/1986 | Nunn | 73/4 R |
| 4,672,974 | 6/1987 | Lee | 73/4 R X |

FOREIGN PATENT DOCUMENTS

| | | | |
|---|---|---|---|
| 3509682 | 9/1986 | Fed. Rep. of Germany | 73/1 R |
| 34113 | 2/1984 | Japan | 73/1 R |
| 175317 | 7/1991 | Japan | 73/1 R |

*Primary Examiner*—Tom Noland
*Attorney, Agent, or Firm*—Clifton L. Anderson

[57] ABSTRACT

A trip controller for a wafer processing system provides for adjustable hysteresis and autocalibration. Adjustable hysteresis implements different trip points for upward pressure changes and downward pressure changes in the wafer processing chamber. Autocalibration is implemented using a digital potentiometer with on-chip storage. The trip controller provides more reliable operation than conventional single trip-point indicators. Yet, the inventive trip controller is readily inserted as a replacement in systems formerly using conventional trip controllers. Further advantages include a single-rail power supply and flexibility to adapt to different systems requiring trip controllers.

4 Claims, 4 Drawing Sheets

AUTOCALIBRATING TRIP CONTROLLER WITH DUAL ADJUSTABLE TRIP POINTS

BACKGROUND OF THE INVENTION

The present invention relates to control systems and, more particularly, to trip controllers. A major objective of the present invention is a trip controller that provides reliable interlocking in response to pressure changes in a integrated circuit wafer processor.

Certain wafer processors involve processing at subatmospheric pressures. The seals that allow the reduced pressures to be achieved must be released to insert wafers before processing into a chamber and to withdraw the processed wafers from the chamber after processing.

Highly automated wafer processors require a sophisticated interlock system to prevent damaging errors. For example, chamber opening should be precluded during vacuum, while purge gas flow should be prohibited once atmospheric pressure is achieved. Accordingly, a trip controller can be used to prohibit or allow certain operations to occur, depending on whether pressure within the chamber is at or below atmosphere.

A conventional trip controller includes a pressure transducer that outputs a voltage as a function of sensed differential pressure between the interior and exterior of a processing chamber. A comparator compares the transducer output voltage with a reference voltage corresponding to atmospheric pressure. The output of the comparator is used to enable/disable the functions associated with the pressure interlock.

Reliability can be a problem with such a trip controller. The signal output by the transducer at a given pressure differential can drift over time, causing a trip to occur above or below the desired pressure. If, for example, the trip controller indicates atmospheric pressure has been reached while the chamber is actually under vacuum, the chamber may be opened prematurely. In this case, the pressure differential can cause turbulence that can stir up contamination, adversely affecting wafer quality. If the trip controller is set too high, the interlock can prevent chamber opening even at atmosphere.

This problem can be addressed by frequent recalibration. The trigger point can be tested by comparison with a digital pressure meter. The trip controller transducer can be adjusted so that its indication of atmosphere matches that of the external pressure meter. However, the calibration can be inconvenient, interrupting processing and requiring skills quite different from those required merely to run the wafer processing equipment.

Furthermore, even a properly calibrated system can have reliability problems. As the pressure of a chamber is increased toward atmosphere, a purge gas can be applied to remove residual reactant gases. The purge gas provides a slightly positive pressure, causing an early indication of atmospheric pressure. If the chamber is thus prematurely opened, the internal pressure can drop as the purge gas is released, causing the interlock to reverse. Thus, there can be oscillating indications, resulting in minor interlock instabilities. What is needed is a trip controller that provides for reliable operation with minimal requirements for calibration.

SUMMARY OF THE INVENTION

In accordance with the present invention, a trip controller includes means for auto-calibration and adjustable hysteresis. The trip controller includes a switch that changes state according to the output of a sensor (transducer). The trip controller includes an offset means for offsetting the sensor output to yield an adjusted output; the offset amount is predetermined by a calibration procedure. The adjusted sensor output is compared with an upper trip point as it rises and a lower trip point as it falls. These trip points can be set independently, effecting an adjustable hysteresis.

The trip means differs from a conventional trip controller in that the upward trip point differs from the lower trip point to effect hysteresis. This helps prevent oscillations when a chamber is opened once a reference condition (atmospheric pressure in the wafer processing application) is indicated. Furthermore, provision is made to adjust the trip points individually. This allows fine tuning for each processing chamber, and the flexibility to adapt to different types of processing systems. The adjustment can be effected simply by adjusting one or two potentiometers.

Calibration can be effected simply by activating a switch during a reference condition. In the wafer processing application, calibration is activated while the chamber is open. This corresponds to a zero pressure differential, and thus atmospheric chamber pressure. During calibration, the adjusted signal is compared with a reference signal. The offset signal is varied until the adjusted and reference signal cross, at which point, the offset signal is fixed until the next calibration operation.

The calibration means preferably includes a digital potentiometer. When calibration is activated, the digital potentiometer is driven to its maximum offset output. Then it is gradually stepped down so that the adjusted output approaches the reference level. When the adjusted output crosses the reference output, the digital potentiometer is frozen, the offset is fixed, and the trip controller is calibrated. Provision is also made for a calibration interlock that prevents calibration from proceeding while the chamber pressure is not close to atmosphere (or alternative reference condition).

One advantage of the invention is that the upward and lower trip points are different, minimizing oscillation of the trip controller as atmosphere is achieved. Flexibility is provided by making the trip points adjustable, preferably independently adjustable. Autocalibration greatly simplifies the offsetting of sensor drift. The digital potentiometer (with memory) provides for accurate reproduction of a calibration setting, even after power down and power up.

An additional advantage flows from the programmable hysteresis. A conventional trip controller can indicate that vacuum is achieved despite a leak in the chamber seal, since a slightly below atmosphere pressure can be achieved. By setting a lower downward trip point, the vacuum indicator can more reliably indicate an effective seal and vacuum.

Significantly, the present invention achieves its objectives without expensive microprocessor devices. No software programming is required. Interfacing can be minimal. These and other features and advantages of the present invention are apparent from the description below with reference to the following drawings.

DESCRIPTION OF THE PREFERRED EMBODIMENT

Figure 1:
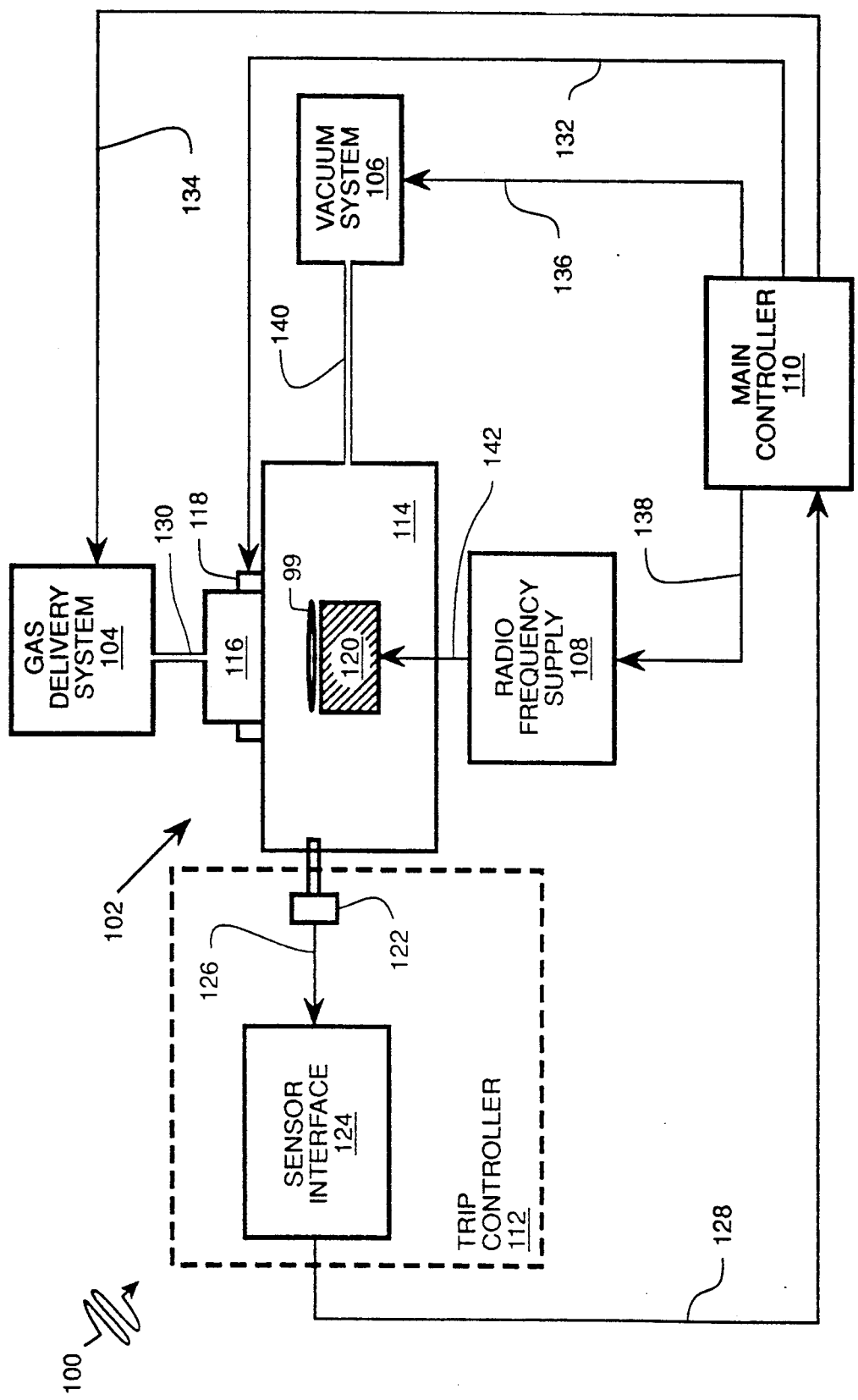
FIG. 1 is a schematic diagram of a wafer processing system incorporating a trip controller in accordance with the present invention.

A wafer processing system 100 in accordance with the present invention includes a wafer processing chamber 102, a gas delivery system 104, a vacuum system 106, a radio frequency supply 108, a main controller 110, and a trip controller 112. Chamber 102 includes a lower chamber 114, an upper chamber 116 and a mechanical interlock 118. Lower chamber includes an wafer support 120 for supporting a wafer 99 to be processed. Wafer support 120 serves as one electrode for radio frequency supply 108.

Trip controller 112 includes a sensor 122, a sensor interface 124, and a sensor bus 126. Sensor 122 is a differential pressure transducer, outputting a voltage representing the pressure difference between the interior and exterior of chamber 102. This voltage is delivered to sensor interface 124 via three-line cable 126, which also serves to deliver power and ground voltages to sensor 122 to power its operation.

Sensor interface 124 monitors the sensor output, providing indications when pressure rises above an upper trip point and when pressure falls below a lower trip point. The indications are provided to main controller 110 via bus 128. Bus 128 includes two cables. One cable has three lines to provide power and ground to sensor interface 124, and to provide a voltage signal to main controller 110 representing instantaneous pressure. One of the features of interface 124 is that it operates on a single-rail power supply. The second cable has two lines which are shorted when the pressure rises above the upper trip point and which are isolated when the pressure falls below the lower trip point.

Main controller 110 responds to the shorted or isolated condition of the line in the two-line cable by imposing or releasing various safety interlock systems. After wafer processing, the chamber vacuum is weakened by the introduction of purge gas from gas delivery system 104 through a conduit 130. When atmospheric pressure is attained or exceeded, the lines of the two-line cable are shorted, main controller 110 releases mechanical interlock 116 via bus 132 so that upper chamber 116 can be lifted off lower chamber 114 to permit wafer 99 to be removed after processing and a new wafer to be introduced into chamber 102. In addition, main controller 110 inhibits gas deliver system 104 via bus 134, shuts off vacuum system 106 via bus 136, and inhibits radio frequency supply 108 via bus 138.

Once a new wafer is introduced, upper chamber 116 is lowered onto lower chamber 114. Vacuum system 106 is activated, withdrawing air via conduit 140. When chamber pressure falls below the lower trip point, mechanical interlock 118 is locked. In addition, the interlock imposed on gas delivery system 104 and radio frequency supply 108 is removed so that they can operate as conditions dictate. Thus, when a high vacuum is attained, gas delivery system 104 can deliver a reactant gas and radio frequency supply 108 can deliver radio frequency electrical energy along bus 142 to ionize the reactant gas and initiate wafer processing.

Figure 2:
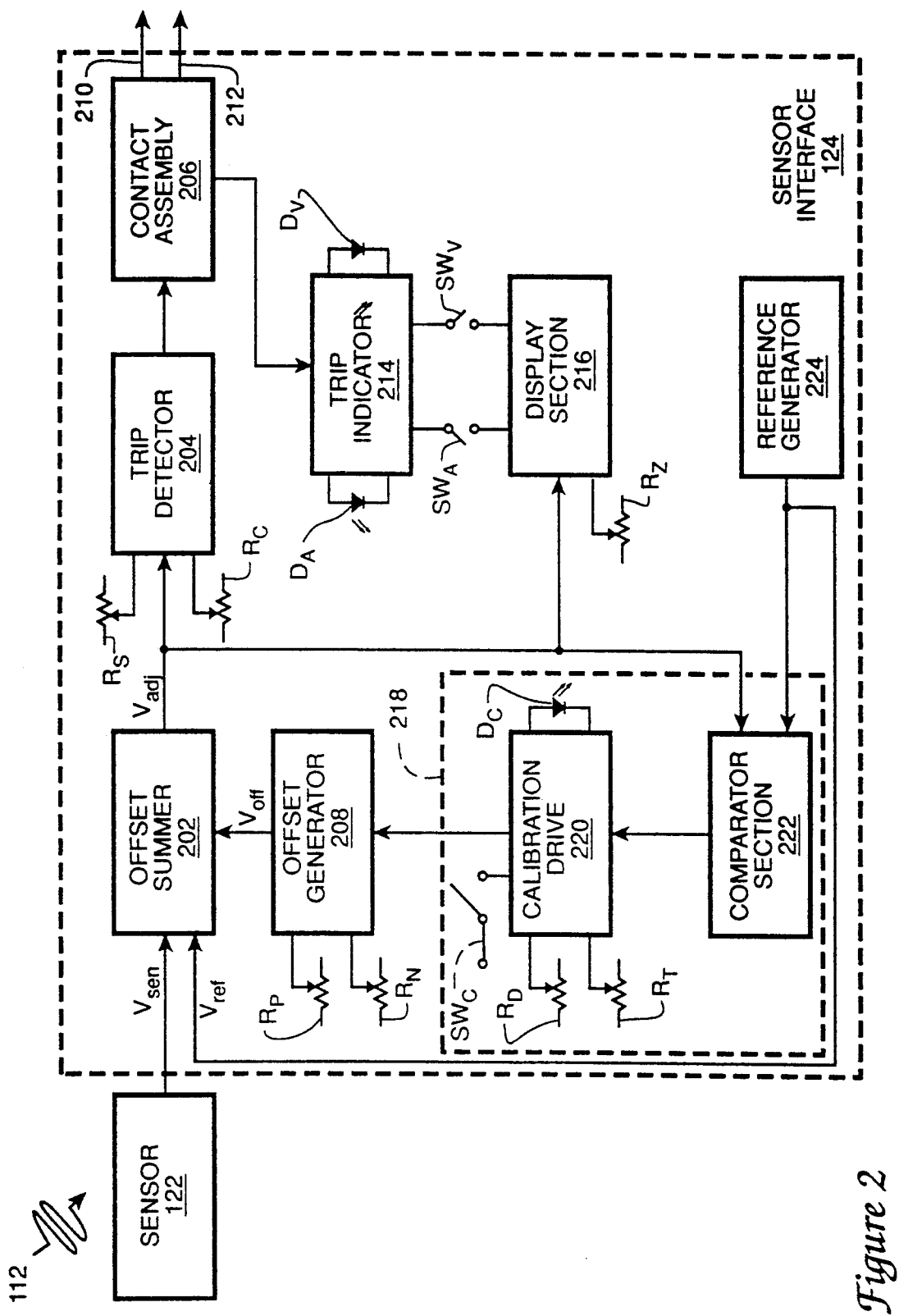
FIG. 2 is a block diagram of the trip controller of FIG. 1.

As shown in FIG. 2, sensor interface 124 includes an offset summer 202, a trip detector 204, and a contact assembly 206. Offset summer 202 is coupled to sensor 122 for receiving its voltage output $V_{sen}$. Offset summer 202 is also coupled to an offset generator 208 that generates an offset voltage $V_{off}$ determined through calibration. The sensor output and the offset voltage are combined to yield an adjusted voltage $V_{adj}$ which is directed to trip detector 204.

Trip detector 204 compares the adjusted voltage with the upper and lower trip points in alternation. In other words, trip detector 204 does not make two consecutive upper trip point detections and does not make two consecutive lower trip points detections. For example, if after an upper trip point detection, chamber pressure falls to a pressure between the trip points and then rises again above the upper trip point without falling below the lower trip point, the second crossing of the upper trip point is not indicated. Also for example, after an indication of a fall through the lower trip point, no further indication will be made until pressure rises above the upper trip point.

The upper trip point and lower trip points can be adjusted by moving the wipers of potentiometers $R_C$ and $R_S$. Potentiometer $R_S$ is used to adjusted the span between the trip points. Potentiometer $R_C$ adjusts both trip points while maintaining the span set by potentiometer $R_S$. Together, potentiometers $R_C$ and $R_S$ permit independent control of both trip points. Both of these wipers can be accessed by turning respective screws accessible from the exterior of sensor interface 124. Trip detections are directed to contact assembly 206 which shorts lines 210 and 212 of the two-line cable of bus 128 in response to an upper trip point detection and isolates these lines in response to a lower trip point detection.

Trip detections are also directed from contact assemblyt 206 to a trip indicator 214. Trip indicator 214 includes two light-emitting diodes (LEDs) $D_A$ and $D_V$. Upon an upper trip point detection, red upper LED $D_V$ is illuminated, indicating that chamber 102 has achieved atmospheric pressure; concurrently, green lower LED $D_V$ is deactivated. Illumination is reversed upon a lower trip point detection: green LED $D_V$ illuminates indicating chamber 102 is under vacuum.

The adjusted voltage from offset summer 202 is also directed to a display section 216 to permit continuous monitoring of chamber pressure. Provision is also made for using display section 216 to check the upper and lower trip points. By holding a switch $SW_A$ closed as pressure is rising from a vacuum, the reading at the time of an upper trip point detection is frozen long enough for a clear reading. Similarly, by holding a switch $SW_V$ closed as pressure falls through the lower trip point, the display reading at the time of a lower trip point is detection is frozen long enough for a clear reading. For trip controller 112, the trip point indications for this purpose are received from contact assembly 206 instead of trip detector 204.

The bias of display section 216, e.g., the pressure at which display section 216 provides a zero reading, can be adjusted by moving the wiper of a potentiometer $R_Z$. For system 100, potentiometer $R_Z$ is adjusted for a zero reading at atmospheric pressure. However, some systems require both trip points to be below atmosphere, and in these systems it can be more convenient to set a zero reading at a specific subatmospheric pressure.

Over time, sensor 122 can drift, e.g., the voltage output at atmosphere can change. Accordingly, a calibration section 218 is used to rest the offset voltage provided by offset generator 208. Calibration section 218 includes a calibration drive 220 and a comparator section 222.

Calibration is initiated while chamber 102 is at atmosphere by pressing a calibration switch SW$_C$. This initiates a procedure during which the offset voltage is driven to a maximum positive value, set by a "positive" potentiometer R$_P$, and then stepped downward toward a full negative offset, which is set by "negative" potentiometer R$_N$. Calibration provides for adjusting the rate at which the offset voltage is stepped by moving a wiper of a "timer" potentiometer R$_T$, and for adjusting the time allotted to reaching the maximum positive offset voltage by moving the wiper of a "direction" potentiometer R$_D$. During the downward stepping, the adjusted voltage is compared by comparator section 222 with a reference voltage V$_{ref}$ provided by a reference generator 224. The reference voltage is about 4.58 V, well within the linear range of the operational amplifiers, including OP1.

When the adjusted voltage crosses the reference voltage, comparator section 222 so indicates to calibration drive 220, and the present offset voltage is fixed and its value is stored. At this point a green LED D$_C$ of calibration drive 220 is illuminated; this same LED D$_C$ is deactivated when calibration is initiated. The LEDs are set so that two green LEDs D$_V$ and D$_C$ are illuminated when interface 124 is calibrated and chamber 102 is under vacuum. Under atmospheric pressure and after calibration, the red atmosphere-indicating LED D$_A$ and green calibration LED D$_C$ are illuminated.

Figure 3:
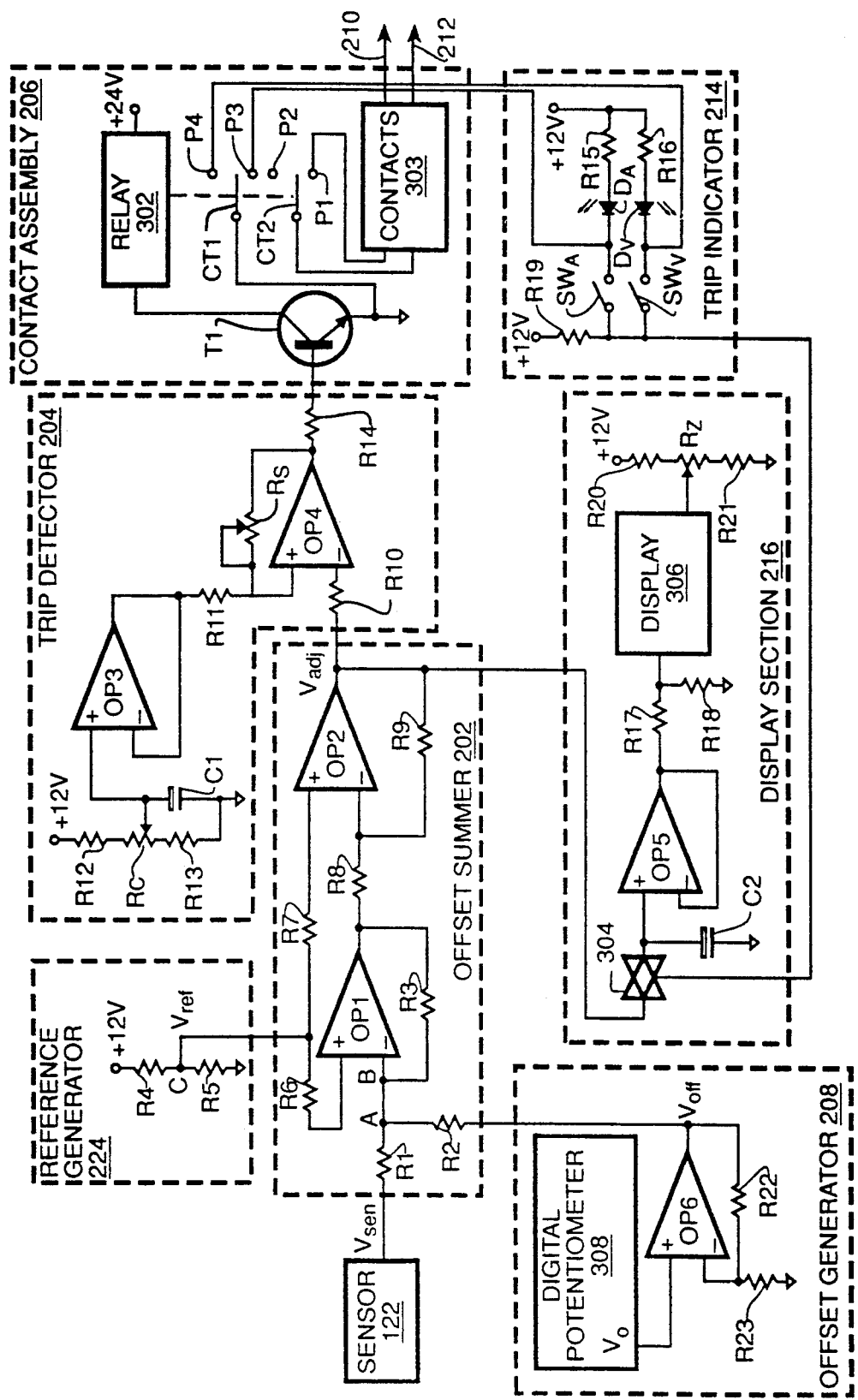
FIG. 3 is a detailed circuit diagram of an operational section of the trip controller of FIG. 1.

The real-time operation of trip controller 112 is detailed with reference to FIG. 3. Offset summer 202 includes two operational amplifiers OP1 and OP2. The negative input of OP1 receives three inputs; for expository purposes, this input is separated into two nodes A and B. Node A is a summing junction for the output voltage of sensor 122 and the offset voltage of offset generator 208. Equal weighting is provided since the resistor R1 between sensor 122 and node A has the same value, 10 kΩ, as the resistor R2 between offset generator 208 and node A. The resulting summed voltage is added at node B to feedback from the output of OP1 through a resistor R3 with the same value as R1 and R2.

The positive input of OP1 is held at the reference voltage, which is determined by reference generator 224. Reference generator 224 is a voltage divider with a 1.1 kΩ resistor R4 tied to 12 V and a 680 Ω resistor R5 tied to ground, with an intermediate node C being at V$_{ref}$, which is about 4.58 V. Node C is coupled to the positive input of OP1 via a resistor R6 and the positive input of OP2 via a resistor R7. Resistors R6 and R7 are of equal resistances, 1 kΩ, so that the reference voltage is applied to both positive inputs.

The source output of sensor 122 has a range of 1–6 volts, with atmosphere being indicated at about 3.5 volts. This range extends below the linear operation of the single-rail operational amplifiers configured in sensor interface 124. The offset voltage is adjusted about 2 volts higher so that the summed voltage (averaged voltage) is comfortably within the operational range of the amplifiers. As configured, OP1 keeps its output within this linear operating range. OP1 also inverts the sense of the summed voltage, so that a higher sensor output results in a lower output from OP1.

OP2 corrects the sense so that its output, which is the adjusted voltage V$_{adj}$, has the same sense as the sensor output. The output of OP1 is coupled, via a resistor R8, to the negative input of OP2, where it is summed with the adjusted voltage V$_{adj}$ which is fed back through a resistor R9. Resistors R8 and R9 have equal resistances, 1 kΩ, so that the negative input of OP2 serves as a summing junction.

The adjusted voltage is directed to trip detector 204, which comprises operational amplifiers OP3 and OP4. The adjusted voltage is received via a resistor R10, which has a resistance of 1 kΩ, and serves primarily for device protection. OP3 provides a constant, albeit adjustable, voltage to the positive input of OP4 through a resistor R11, 330 Ω. Combined with this input is feedback through span potentiometer R$_S$ from the output of OP4. Potentiometer R$_S$ has a maximum resistance of 250 kΩ. This positive feedback configuration results in a full positive (5 V) or full negative (ground) output from OP4.

This configuration functions as a comparator with a shifting threshold at the positive input. When the adjusted voltage is low, the output of OP4 is high, and this high voltage is combined with the voltage supplied from OP3. When the adjusted voltage is high, a low output from OP4 is combined with with the voltage from OP3. This effects the different trip points as a function of the different directions of pressure change. If potentiometer R$_S$ is set to a high resistance, the effect of OP4 feedback will be small, so the difference between the trip points will be small. If potentiometer R$_S$ is set to a low resistance, the effect of OP4 will be large, so the difference between the trip points will be large. Thus, the span between the trip points can be adjusted by moving the wiper of potentiometer R$_S$.

Once potentiometer R$_S$ is set, the absolute values of the trip points can be set by adjusting center potentiometer R$_C$, which has a maximum resistance of 100 Ω. Potentiometer R$_C$ is configured within a voltage divider including a resistor R12 (1.5 kΩ) tied to 12 V and a resistor R13 (410 Ω) tied to ground. Potentiometer Rc is between these resistors. The wiper of potentiometer Rc is coupled to the positive input of OP3. A capacitor C1 (10 Ωf/35 V) between this input and ground is used for noise reduction. The output of OP3 is fed back to its negative input. OP3 serves basically as a buffer between potentiometer R$_C$ and the input to OP4. The output of OP3 defines the voltage about which the positive input to OP4 swings.

The effectively binary output of OP4 is directed via a resistor R14 (10 kΩ) to the base of a transistor T1 of contact assembly 206. The collector of T1 is coupled to a relay 302, while the emitter of T1 is tied to ground and to a contact CT1 of relay 302. Relay 302 has a second contact CT2 which is coupled to line 212. When the adjusted voltage trips OP4, its output goes low, turning transistor T1 off. With T1 off, relay 302 lowers its contacts CT1 and CT2. CT2 contacts a pin P1 that is coupled to line 210, thus shorting line 210 and 212. As described above, main controller 110 interprets this short as indicating atmospheric pressure has been achieved. CT1 contacts a pin P3 coupled to the cathode end of LED DA, which is thereby grounded. This causes LED D$_A$ to illuminate. The anode end of LED D$_A$ is coupled to 12 V via a resistor R15 having a resistance of 1 kΩ.

When the adjusted voltage drops below the lower trip point, transistor T1 is turned on. Relay 302 raises its contacts so that contact CT2 is coupled to a floating pin P2, isolating lines 210 and 212, providing a vacuum indication to main controller 110. Additionally, contact CT1 is coupled to a pin P4, tied to the cathode end of green LED $D_V$. This illuminates vacuum indicator LED $D_V$. The anode end of LED $D_V$ is coupled to 12 V via a resistor R16 having a resistance of 1 kΩ. Note that lines 210 and 212, coupled to contacts 303, are electrically isolated from the rest of sensor interface 124, so that they can handle a substantial current as required.

In addition to being provided to trip detector 204, adjusted voltage $V_{adj}$ is provided to display section 216. Specifically, it is provided to the input of a CMOS switch 304, the output of which is coupled to the positive input of an operational amplifier OP5. The negative input of OP5 receives the feedback from the output of OP5 so that OP5 functions as a buffer between CMOS switch 304 and a display 306. OP5 is coupled to display 306 via a resistor R17, 94 kΩ. The input to display 306 is also coupled to ground via a resistor R18, 8 kΩ. The control for CMOS switch 304 is tied to 12 V via a resistor R19, 10 kΩ, so that it is closed (unless switch $SW_A$ or switch $SW_V$ is closed and the corresponding contact assembly contact CT1/P3 or CT1/P4 is made). While CMOS switch 304 is closed, display 306 monitors the adjusted voltage.

Since display 306 normally tracks the adjusted voltage, its reading can change too quickly to confirm the readings at which trips occur, as would be desirable to determine whether or not calibration is required. Switches $SW_A$ and $SW_V$ are provided for this confirmation purpose.

Holding $SW_A$ closed couples pin P3 to CMOS switch 304. While chamber 102 is under vacuum, pin 3 is floating and CMOS switch remains closed so that display 306 shows the current chamber pressure. When the high trip point is crossed, contact CT1 grounds pin P3. This causes atmosphere-indicating LED $D_A$ to illuminate and CMOS switch 302 to open. Opening switch 302 decouples the adjusted voltage from display 306, which is then controlled instead by capacitor C2. The voltage on C2 is the adjusted voltage at the moment the high trip point is crossed. Thus, display 306 reads the high tap voltage. Capacitor leakage will allow this reading to drift, but sufficient time is given for a human reader to ascertain the trip reading.

Holding $SW_V$ closed couples pin P4 to CMOS switch 304. While chamber 102 is at atmosphere, pin 4 is floating and CMOS switch 302 remains closed under the influence of the 12 V supply through resistor R19 so that display 306 shows the current chamber pressure. When the low trip point is crossed, contact CT1 grounds pin P4. This causes vacuum-indicating LED $D_V$ to illuminate and CMOS switch 302 to open. Opening switch 302 decouples the adjusted voltage from display 306, which is then controlled instead by capacitor C2. The voltage on C2 is the adjusted voltage at the moment the low trip point is crossed. Thus, display 306 reads the low trip voltage long enough for a human to read it.

The bias of display 306 can be set by moving the wiper of display potentiometer $R_Z$ having a maximum resistance of 100 Ω and 20 turns. Potentiometer $R_Z$ is located between voltage divider resistors R19 and R20. Resistor R19 is tied to 12 V and has a resistance of 2.83 kΩ, and R20 is tied to ground and has a resistance of 340 Ω. However, display 306 is relatively immune to drift and potentiometer $R_Z$ is used primarily to allow trip controller 112 to be used in different types of systems.

More than likely, drifting trip levels indicates sensor drift. This is corrected by adjusting the offset voltage provided by offset generator 208, which comprises a digital potentiometer 308 and an operational amplifier OP6. The offset voltage is determined by the voltage from output $V_o$ from a digital potentiometer 308. This voltage, centered around 3.65 V, is provided to the positive input of OP6. The output of OP6 is the offset voltage, which is feedback to the negative input of OP6 via a resistor R22, 10 kΩ. The negative input is also tied to ground via a resistor R23, 20 kΩ. The effect of this arrangement is to step up voltage $V_o$ to be centered about 5.65 V. This offset level is about as far above the reference voltage of 4.58 V as the sensor voltage is below it. Thus, the summed voltage is about at the reference voltage.

Figure 4:
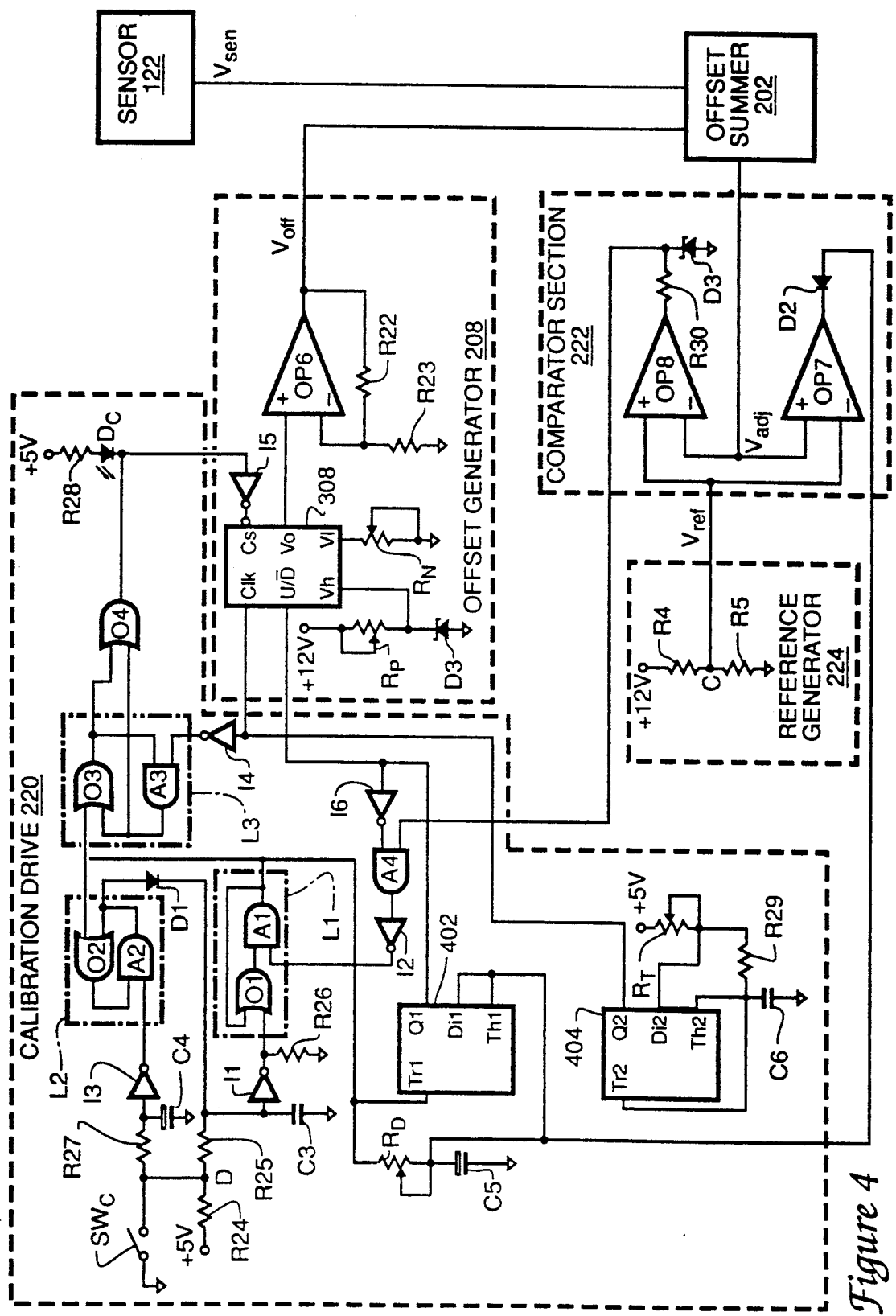
FIG. 4 is a detailed circuit diagram of a calibration section of the trip controller of FIG. 1.

Calibration involves adjusting $V_o$, this process is described with reference to FIG. 4. Calibration is initiated by depressing calibration switch $SW_C$ while the chamber is at atmosphere, or at some other reference pressure. This drives to ground node D, which is normally held high due to its coupling to +5 V through 4.7 kΩ resistor R24. This grounding discharges capacitor C3 through resistor R25, which also has a resistance of 4.7 kΩ. Once capacitor C3, 1 μf/50 V, is discharged, an inverter I1 goes high.

Note that capacitor C3 is held low for a short duration upon power up. Accordingly, inverter I1 goes high on power up, initiating calibration. If autocalibration upon startup is not desired, C3 can be removed so that I1 is tied to 5 V through R24 and R25.

The output of inverter I1 is normally held low, as it is tied to ground via a resistor R26, 10 kΩ. The output of I1 is input to a latch L1, comprising an OR-gate O1 and an AND-gate A1. After $SW_C$ is activated, the high output of I1 drives OR-gate O1 high. Normally, the input to A1 from an inverter I2 is high, so in this condition, the high output from O1 drives A1 high. The high output from A1 is fed back to O1, holding it high even after inverter I1 goes low, which will occur when $SW_C$ is released.

The output of latch L1 is directed to the inputs of latch L2. Latch L2, comprises an OR-gate O2 and an AND-gate A2. Latch L2 serves to debounce switch $SW_C$. When $SW_C$ is depressed, an inverter I3 goes high, and a capacitor C4 (22 μf/35 V) is discharged through resistor R27 and $SW_C$. The charge/discharge time for C4, 22 μf/35 V, through resistor R27, 10 kΩ, is about 0.5 seconds. Once C4 is discharged, it drives one input of A2 high via inverter I3. The other input of A2 is driven high since A1 drives O2 high. The resulting high output from A2 is fed back to O2, activating latch L2. With A2 high, a diode D1 conducts, charging C3 and holding I1 low, regardless of the position of $SW_C$. Thus, calibration cannot recur until latch L2 is deactivated. This occurs after $SW_C$ is released for about 0.5 seconds, allowing capacitor C4 to charge.

The output of latch L1 also engages latch L3, which comprises an OR-gate O3 and an AND-gate A3. The high output from latch L1 drives OR-gate O3 high, which in turn drives an OR-gate O4 high. If LED $D_C$ is illuminated, it will be turned off in this situation. LED $D_C$ is coupled to +5 V via a resistor R28, 470 Ω, which serves to limit the current through LED $D_C$. An unilluminated $D_C$ indicates that trip controller 112 is not calibrated. The high output of O4 also drives an inverter I5 low, activating the chip select input $C_S$ of digital potentiometer 308. This permits its output voltage $V_o$ to be affected by inputs to the clock input Clk and the up/down input U/D.

The up/down input of digital potentiometer 308 is controlled by direction controller 402. (Direction controller 402 and clock circuit 404, described below, are two timer circuits on a National Semiconductor NE556 device.) The high output from latch L1 activates the trigger input Tr1 of direction controller 402, causing output Q1 to go high, setting digital potentiometer 308 to count upward in response to received clock pulses. In the meantime, capacitor C5 is charged through "direction" potentiometer $R_D$.

When capacitor C5 is charged to about 3.3 volts ($\frac{2}{3}$ $V_{cc}$ for direction controller 402), threshold input Th1 is triggered, shorting discharge port Di1 to ground. This discharges capacitor C5. When the voltage across C5 drops to about 1.7 volts (Vcc/3), Q1 goes low; the corresponding low signal at input U/D causes digital potentiometer 308 to count downwards in response to incoming clock pulses. The length of time that Q1 is high depends on the time required to charge capacitor C5 which can be adjusted by moving the wiper of potentiometer $R_D$. Potentiometer $R_D$ is a 1 MΩ resistor with 20 turns. Capacitor C5 is 1 μf/100 V.

The clock input Clk of digital potentiometer 308 is driven by clock circuit 404, which serves as a free running clock with an adjustable clock period. When capacitor C6 charges to 3.3 volts, trigger input Tr2 is activated and Q2 goes high, providing a high clock level to digital potentiometer 308. Threshold input Th2 is also activated, shorting discharge port Di2 to ground. Capacitor C6, 1 μf/50 V, is discharged through resistor R29. When capacitor C6 falls to about 1.7 volts, Q2 goes low, providing a low clock level to digital potentiometer 308. When Q2 goes low, port Di2 is opened. Capacitor C6 then charges through resistor R29 and potentiometer $R_T$, 1 MΩ, 20 turns. When capacitor C6 charges to 3.3 volts, the next cycle begins. Thus, the length of time Q2 stays low, and thus the clock rate, can be adjusted by moving the wiper of potentiometer $R_T$.

Potentiometers $R_D$ and $R_T$ are adjusted so that the Q1 is high for about 200 clock cycles. Digital potentiometer 308 provides for 200 steps between full negative and full positive offset values for $V_o$. By holding Q1 high for 200 clock cycles, one is assured that digital potentiometer is driven to its full positive value before it is stepped down. Note that the full positive offset can be adjusted using potentiometer $R_p$ tied to input $V_h$ of digital potentiometer 308; the full negative offset can be adjusted using potentiometer $R_N$ tied to input $V_l$ of digital potentiometer 308. Zener diode D3 limits the voltage applied to input $V_h$ for device protection.

While Q1 is high and Q2 is cycling, digital potentiometer 308 counts up towards its full positive offset voltage. During this interval, digital potentiometer output voltage $V_O$ changes, and thus so does the offset voltage from operational amplifier OP6. As is this case during pressure measurement, the offset voltage is combined with the voltage from sensor 122, which is sensing atmospheric pressure, or other reference pressure, at offset summer 202. The adjusted voltage from offset summer 202 is directed to comparator 222, which includes two comparators OP7 and OP8 that compare the adjusted voltage with the reference voltage.

OP7 provides a low output when the adjusted voltage is below the reference voltage. When OP7 is low, a diode D2 conducts, preventing capacitor C5 from charging sufficiently to trigger threshold input Th1 of direction controller 402. If the adjusted voltage exceeds the reference voltage, diode D2 isolates OP7 from direction controller 402, which then proceeds as described above to provide a low Q1, directing digital potentiometer 308 to count down. This will occur both where the adjusted voltage exceeds the reference voltage at the beginning of calibration and where the adjusted voltage crosses the reference voltage during the upward stepping of digital potentiometer 308.

If, however, the adjusted voltage fails to exceed the reference voltage even at the full positive offset, D2 will continue to conduct, preventing capacitor C5 from charging. Accordingly, threshold input Th1 will not reach 3.7 V, which is a precondition to Q1 going low. Thus, and Q1 stays high. This can occur if calibration switch $SW_C$ is activated under a substantial vacuum. In this case, the calibration procedure is interrupted and calibration LED $D_C$ fails to illuminate, warning the operator that trip controller 112 remains uncalibrated.

Normally, the adjusted voltage will exceed the reference voltage at the full positive offset, allowing Q1 to go low and digital potentiometer 308 to step downward. The adjusted voltage is stepped down with digital potentiometer 308. The desired setting for digital potentiometer 308 and the offset voltage is reached when the adjusted voltage crosses the reference voltage.

When the adjusted voltage falls below the reference voltage, comparator OP8 goes high. As described immediately below, this logic level change terminates the calibration procedure. A resistor R30, 10 kΩ, serves as a current limiter, while a zener diode D3 serves as a voltage limiter to protect downstream logic. The high output from OP8 is applied to one input an AND-gate A4. The other input to A4 is provided by an inverter I6, which provides a high output when output Q1 of direction controller 402 is low. As indicated above, Q1 is low at this point in the calibration process.

The logic high from A4 results in a logic low from inverter I2, releasing latch L1 by providing a low at AND-gate A1. This results in a low to input Tr1 of direction controller 402, holding Q1 low. The change from A1 does not normally affect latch L2, which would normally have been released at this point.

With A1 low, OR-gate O3 goes low when AND-gate A3 goes low, which occurs when inverter I4 goes low and releases latch L3. Inverter I4 goes low while Q2 and, thus, clock input Clk to digital potentiometer 308, are high. Thus, on the next high Q2 after A1 goes low, A3 and O3 go low, driving O4 low, and inverter I5 high. This deactivates chip select input Cs of digital potentiometer 308 so that no further changes occur in $V_o$. Digital potentiometer 308 is a Xicor X9102, which stores the set $V_o$ in on-chip memory provided chip deselection occurs on a high clock. The operation of latch L3 just described insures storage of $V_o$. Thus, the calibrated offset voltage is maintained even when trip controller 112 is powered down. Also when OR-gate O4 goes low, LED DC is illuminated, signaling that calibration has been completed and that trip controller 112 is ready for a new wafer cycle.

The present invention provides for a variety of implementations other than that described above. Those skilled in the art can recognize that there are many different circuits that perform substantially equivalently to the described circuits. For example, hysteresis can be implemented in different ways, permitting one potentiometer to adjust the high trip point and another to adjust the low trip point. These and other variations upon and modifications to the disclosed embodiments are provided for by the present invention, the scope of which is limited only by the following claims.

What is claimed is:

1. A trip controller comprising:

switch means for controlling a device, said switch means having a first state and a second state;

sensor means for outputting a signal the signal level of which corresponds to a currently sensed condition;

offset means for offsetting said signal by an offset amount to obtain an adjusted signal with an adjusted level;

trip means for switching said switch means to its first state when said adjusted level rises above an upper threshold and for switching said switch means to its second state when said adjusted level falls below a lower threshold; and calibration means for setting said offset amount so that a current adjusted level approximates a predetermined reference level in response to a calibration activation signal, said calibration means including a digital potentiometer having a high voltage input for receiving a high voltage and a low voltage input for receiving a low voltage, said digital potentiometer having a voltage output for providing an output voltage between said high voltage and said low voltage, said digital potentiometer having digital input means for adjusting said output voltage in response to digital input signals, calibration drive means for providing said digital input signals to adjust said output voltage, said calibration drive means including calibration activation means for activating said calibration drive means, said calibration drive means being coupled to said offset means so as to detect when the adjusted voltage attains a predetermined threshold, said calibration means being configured to terminate adjustment of said output voltage when said adjusted voltage attains said predetermined threshold, and offset means for deriving said offset voltage from said output voltage;

whereby, said trip controller is automatically calibrated when said calibration activation means is activated while said currently sensed condition is a predetermined reference condition.

2. A trip controller as recited in claim 1 wherein said trip means includes trip set means for setting said upper threshold and said lower threshold.

3. A trip controller as recited in claim 1 wherein said trip set means includes at least one potentiometer that when varied changes at least one of said upper threshold and said lower threshold.

4. A trip controller as recited in claim 1 wherein said calibration means includes:

stepping means for stepping said digital potentiometer so that said adjusted level approaches said reference level;

comparator means for detecting when said adjusted level crosses said reference level; and hold means for stopping the stepping of said digital potentiometer when said adjusted level crosses said reference level so that said offset amount stays constant;

whereby when said calibration activation means activates said calibration means, said stepping means adjusts said offset amount until said adjusted level crosses said reference level, at which time said offset amount remains constant until said calibration activation means again activates said calibration means.

* * * * *